United States Patent
Hall

(10) Patent No.: US 8,675,181 B2
(45) Date of Patent: Mar. 18, 2014

(54) COLOR LIDAR SCANNER

(75) Inventor: David S. Hall, Los Altos, CA (US)

(73) Assignee: Velodyne Acoustics, Inc., Morgan Hill, CA (US)

(*) Notice: Subject to any disclaimer, the term of this patent is extended or adjusted under 35 U.S.C. 154(b) by 484 days.

(21) Appl. No.: 12/792,636

(22) Filed: Jun. 2, 2010

(65) Prior Publication Data

US 2010/0302528 A1   Dec. 2, 2010

Related U.S. Application Data

(60) Provisional application No. 61/183,265, filed on Jun. 2, 2009.

(51) Int. Cl.
*G01C 3/08* (2006.01)

(52) U.S. Cl.
USPC .......... 356/5.01; 356/3.01; 356/4.01; 356/5.1

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 4,834,531 A | 5/1989 | Ward | |
| 4,862,257 A | 8/1989 | Ulich | |
| 6,593,582 B2 | 7/2003 | Lee et al. | |
| 6,636,300 B2 | 10/2003 | Doemens et al. | |
| 6,646,725 B1 * | 11/2003 | Eichinger et al. | 356/28 |
| 7,248,342 B1 | 7/2007 | Degnan | |
| 2002/0003617 A1 | 1/2002 | Doemens et al. | |
| 2003/0043363 A1 | 3/2003 | Jamieson et al. | |
| 2003/0090646 A1 | 5/2003 | Riegl et al. | |
| 2006/0132635 A1 | 6/2006 | Land | |
| 2006/0197867 A1 | 9/2006 | Johnson et al. | |
| 2007/0035624 A1 | 2/2007 | Lubard et al. | |
| 2008/0074640 A1 * | 3/2008 | Walsh et al. | 356/5.01 |
| 2010/0020306 A1 | 1/2010 | Hall | |
| 2010/0053591 A1 * | 3/2010 | Gibson et al. | 356/3.09 |

OTHER PUBLICATIONS

Hall, et al., "Team DAD Technical Paper," DARPA Grand Challenge 2005, XP-002543336, pp. 1-12; Aug. 26, 2005.

Maris Juberts, "Status report on next generation LADAR for driving unmanned ground vehicles" Mobile Robots XVII, edited by Douglas W. Gage, Proceedings of SPIE, vol. 5609, pp. 1-12, 2004.

* cited by examiner

*Primary Examiner* — Luke Ratcliffe

(74) *Attorney, Agent, or Firm* — Lowe Graham Jones PLLC

(57) ABSTRACT

A color LiDAR scanner device includes color laser diodes (red, green, blue) and avalanche photodetector diodes (red, green, blue) that illuminate and detect the color light intensity returned from a target. In a preferred version these color laser/detectors are coupled with a single infrared laser/detector that detects the range and infrared light intensity from the same target. The combined range and color intensity information is combined to produce a single colored pixel in space. Multiple illuminations are used to create multiple pixels which can be combined to produce images. A rotating housing may be used for an entire surrounding image.

14 Claims, 5 Drawing Sheets

COLOR LIDAR SCANNER

PRIORITY CLAIM

This application claims the benefit of prior provisional application Ser. No. 61/183,265 filed on Jun. 2, 2009, the contents of which are hereby incorporated by reference.

FIELD OF THE INVENTION

This invention relates generally to systems and methods for laser imaging detection and ranging, particularly including such systems that are capable of processing both ranging and color information.

BACKGROUND OF THE INVENTION

There are many laser imaging detection and ranging (LiDAR) range-finding systems that can capture a pixilated image in 2D and 3D format. These sensors use Infrared (IR) lasers to issue a pulse of light that travels to a target that then bounces off and returns to a detector. By tracking the time of flight of the light pulse, a distance can be calculated. This distance, combined with the position and directional angle of the sensing device, can be converted to a pixel in 3D space. Multiple pixels are combined to form images, including three-dimensional images. Contrast can be obtained by measuring the intensity of the return and rendering accordingly.

LiDAR systems are often preferable since they offer exact distance measurements for each pixel in the image, and rely on their own generated light to illuminate the target and to capture distance pixels. This is useful for navigation, 3D mapping (including low light conditions), object identification, and many other applications. In addition to distance information, IR-based LiDAR systems also report intensity information, useful for identifying contrast features of the surrounding environment (such as road markings), and for adjusting the power applied to the laser beam for subsequent pulses.

While LiDAR is a useful tool for 3D imaging, current LiDAR systems typically render images in grayscale rather than color. Some have tried to produce color versions of LiDAR imaging systems, but such systems are deficient in one respect or another. An effective color LiDAR system in accordance with preferred versions of the present invention helps provide realism for 3D maps, aids in object identification, and provides the ability to capture a full color image using the LiDAR's own supplied light, thus eliminating the need for daylight or other artificial light sources, and eliminating the problems caused by uneven light conditions (such as shadows) at the time of capture.

SUMMARY OF THE INVENTION

In general terms, the present invention is a color LiDAR scanner device. In one example of the invention, three color laser diodes (red, green, blue) and three avalanche photodiodes (red, green, blue) illuminate and then detect the color light intensity returned from a target. In a preferred version these color laser/detectors are coupled with a single infrared laser/detector that detects the range and infrared light intensity from the same target. The combined range and color intensity information is combined to produce a single colored pixel in space. Multiple illuminations are used to create multiple pixels which can be combined to produce images.

The scanning device is contained within a housing that is positioned and configured so that it can be driven by a motor (not shown) to pan, tilt, or rotate about a vertical axis. Accordingly, when the device rotates it scans across a horizontal field of view, rendering multiple pixels as it scans.

The composite signal and data points can be used to create a 360-degree, one pixel thick (z axis slice) color and range representation of the surrounding environment within a desired radius of the device. In an exemplary version, the maximum is a 120 meter radius about the device. If the device is moved with respect to the z axis, or if multiple sets of laser/detectors are employed, a 3D color composite image can be rendered from the data points.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
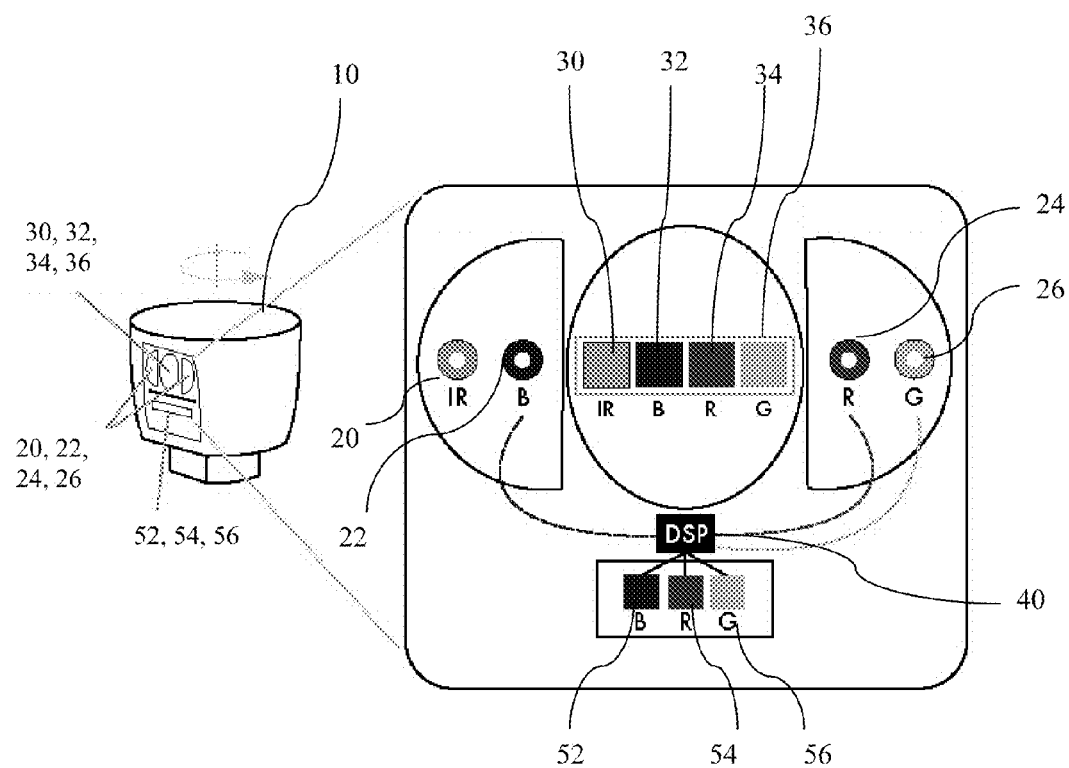
FIG. 1 is a perspective view of an exemplary embodiment of the present invention, together with a front view of a front face with laser diodes and detectors.

As shown in FIG. 1, a preferred version of a LiDAR scanning device is contained within a housing 10. The device in the illustrated version uses four laser diode emitters mounted to be able to send signals at a face of the housing: one each for infrared 20, blue 22, red 24, and green 26. Each emitter is fixed-aligned with a corresponding Avalanche Photodiode (APD) detector, 30, 32, 34, and 36 positioned to receive signals returned to the face of the housing. As shown, the four emitter/detector pairs (20-26 and 30-36) are aligned in a horizontal row that is generally perpendicular to a vertical axis extending through the housing. In a preferred version of the invention, one or more lenses is mounted in front of the emitter/detectors in order to focus the outgoing laser light and the returned light.

The housing 10 is positioned and configured so that it can be driven by a motor (not shown) to rotate about the vertical axis that is perpendicular to the horizontal row formed by the emitter/detector pairs. Accordingly, when the device spins the four emitter/detector pairs each pass across a target along a horizontal plane. Although the four emitter/detector pairs are aligned in a horizontal row, they may be oriented to transmit and detect light at an angle that is angularly offset above or below a plane that is perpendicular to the vertical axis. In other versions of the invention, however, the housing need not rotate. In order to obtain an image of the environment some versions may include a housing that tilts, pans, scans or otherwise moves along a path that may not amount to rotation.

For each pixel that is to be rendered to create an image, the system combines a distance value from the IR emitter/detector with the color values from the RGB emitter/detectors. Preferably the IR emitter detector is pulsed to enable the system to measure return signal timing and thereby calculate distance as a function of signal transit time. The color emitters may be steady state rather than pulsed in versions in which they are not used to determine distance.

In one embodiment, there are 32 color pixels generated for every IR pixel generated. The IR pixel is used for distance measurement, and is needed to understand the distance to the target. The red, green, and blue lasers are used for intensity information and are not used for distance measurement. The IR measurement is crucial not only for placement of the colorized pixel in 3D space, but in also adjusting the intensity of the color return by virtue of the formula $I/R^2$, R=range. In the versions in which the housing rotates, the color intensity return values are each slightly offset horizontally from one another and with respect to the IR value being returned. Accordingly, the horizontal positions of the 32 color intensity returns are interpolated with respect to location between IR distance returns in order to produce a single color intensity value for each of the RGB emitters to match with the IR distance measurement.

Once the IR, blue, red, and green emitter/detector pairs have each passed across the target and have collected their respective information, the color pixel at that particular location can be assembled and rendered.

In one embodiment the device uses four Laser Diodes with the following output specifications:

The IR laser diode emitter 20 preferably operates at 904 nm, in the Infrared spectrum, operating at 70 mW, and is pulsed at 5 ns intervals.

The red laser diode emitter 24 preferably operates at 650 nm, in the Red spectrum, operating at 50 mW, and has a constant output.

The green laser diode emitter 26 preferably operates at 532 nm, in the Green spectrum, operating at 50 mW, and has a constant output.

The blue laser diode emitter 22 preferably operates at 400 nm, in the Blue spectrum, operating at 50 nW, and has a constant output.

In the above example there are four APD Detectors 30, 32, 34, 36 that detect laser radiation reflected from the output lasers 20, 22, 24, 26. The preferred specifications of the four APD Detectors are as follows:

The IR APD detector 30 operating at 904 nm, within the Infrared spectrum.

The red APD detector 34 operating at 650 nm, within the Red spectrum, detecting intensity only.

The green APD detector 36, operating at 532 nm, within the Green spectrum, detecting intensity only.

The blue APD detector 32, operating at 400 nm, within the Blue spectrum, detecting intensity only.

In a preferred version, each APD detector is the same component but individually filtered to detect a desired portion of the light spectrum. For IR detection the detector 30 is unfiltered, but each color detector 32, 34, 36 is fitted with an optical glass bandpass filter specific to its light spectrum. For example, the 532 nm Green detector 36 has a filter that passes "green" light (within the green portion of the light spectrum) and removes all other light.

Figure 2:
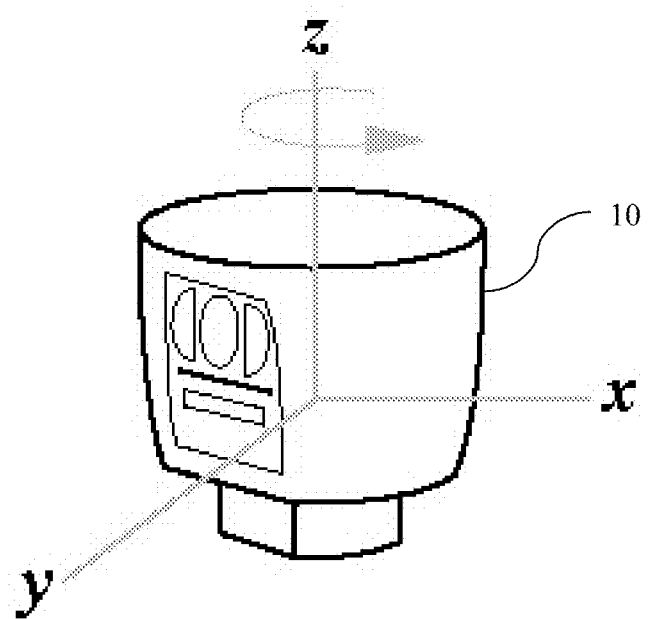
FIG. 2 is a perspective view of an exemplary device configured for rotation to create a three-dimensional color image.

As shown in one embodiment in FIG. 2, the housing may be connected to a motor configured to allow the device to rotate 360 degrees about the Z axis. The horizontal row of emitter/detectors may be oriented to be within a plane defined by the X-Y axes, or may be oriented upward or downward at an angle above or below the X-Y plane.

In a preferred example, the housing rotates at a rate of up to 900 revolutions per minute (15 Hz), with all lasers and detectors mechanically linked and set at a fixed angle with respect to the Z axis. In other versions, the housing may rotate at a faster or slower rate, as desired. The data sampling rate (number of data points received per second) is preferably constant and independent of the rate of rotation, although it may be adjusted as a function of the rate of rotation.

Reflected laser radiation is detected by the respective APDs 30, 32, 34, 36 and the analog intensity signal is digitized. In one version, the digitization uses 16 bits per color detector and 8 bits for the infrared detector. As desired, however, a greater or lesser number of bits may be used for intensity.

The infrared detector determines range by the well-established method of peak-to-peak time measurement from laser pulse to return signal detection. Range data, as provided by the IR emitter/detector pair, is used to calibrate the intensity of the color return in accordance with the formula $I/R^2$. Three 16-bit values (16 bits per R, G, or B) combine to form a 48-bit color point. In other versions, a greater or lesser number of bits may be used for color intensity.

The sampled RGB signals are processed by the Digital Signal Processor (DSP) 40 to create a 2D, 360 degree color/range pixel point cloud that represents a fixed, Z axis position in space. Although a DSP is used in the preferred version, a Field Programmable Gate Array (FPGA) or other processor may alternatively be used. Rendering software stored in a memory and operable by the processor then interprets the point cloud and assembles each RGB pixel in 3D space according to position. If the device is moved with respect to the Z axis (using forward motion, tilting, nodding, or other means), a 3D representation of the physical environment can be created by using appropriate processing and image render algorithms.

FIGS. 1 and 2 further show the preferred laser diode and APD Detector layout on a face of the housing 10. Three Feedback Diodes 52, 54, 56 are used to adjust the color laser output. Each of the components described above are housed in a sealed enclosure.

Figure 3:
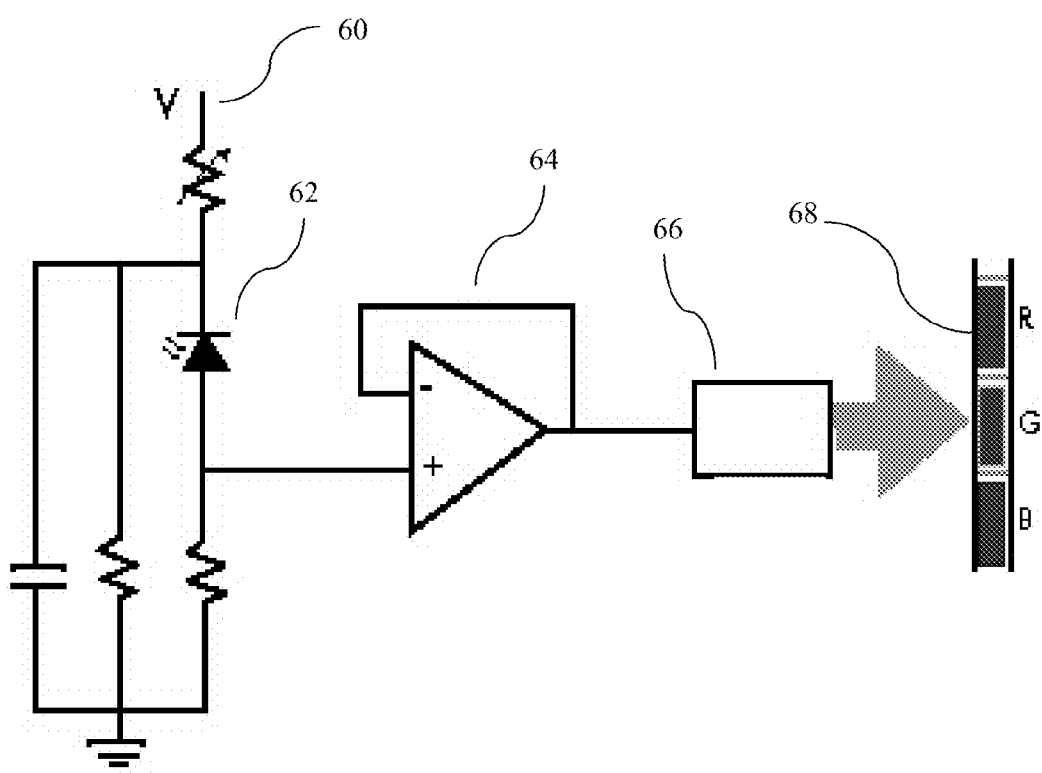
FIG. 3 is a circuit diagram for a color receiver circuit for use with the present invention.

In the RGB Receiver Circuit as shown in FIG. 3, a variable high voltage 60 of 100-200V is applied to the Avalanche Photodiode Detector (APD) 62. Laser energy falling onto (that is, detected by) the APD 62 creates a signal that is first buffered by buffer 64 and then digitized by a 16-bit A/D converter 66, preferably operating at 1 MHz. The A/D converter 66 outputs data to a 48-bit serial bus 68 where each color intensity signal occupies 16 bits. Although one RGB receiver circuit is shown, a circuit such as that shown in FIG. 3 is provided for each of the colors red, blue, and green and then coupled to the bus 68. Thus, the APD 62 as shown in FIG. 3 is intended to represent each of the individual APDs 32, 34, and 36 as illustrated and described above.

The 8-bit IR intensity signal is processed in a manner similar to that described for the color APDs and is provided on a parallel bus.

In addition to bathing the target with color laser signal, each red, green, and blue laser diode signal is also presented to a Receiver Feedback Circuit. This receiver circuit reports the actual laser energy issued by the color lasers to the processor. Thus, as illustrated in FIG. 1, each of the blue, red, and green laser diodes 22, 24, 26 is coupled to a digital signal processor (DSP) 40. The DSP also receives return signals from blue, red, and green feedback detectors 52, 54, 56.

This actual energy issued from the laser emitters is compared to the returned signal for two reasons. First, it provides a benchmark signal that eliminates the variance in the laser diode drive circuit components and always reports the correct departing laser intensity for calibration purposes. Secondly, it allows the DSP to adjust the power to the laser diode to minimize the energy needed to illuminate the target, thus preventing saturation of the APD detectors, minimizing laser diode heat and extending laser diode life. A servo circuit from the Feedback Photodiodes 52, 54, 56 monitors RGB intensity and sends a signal to the DSP 40 where software adjusts the output of the Laser Diodes so as not to saturate the APD detectors. The laser intensity signals are then driven by the RGB DAC output.

Figure 4:
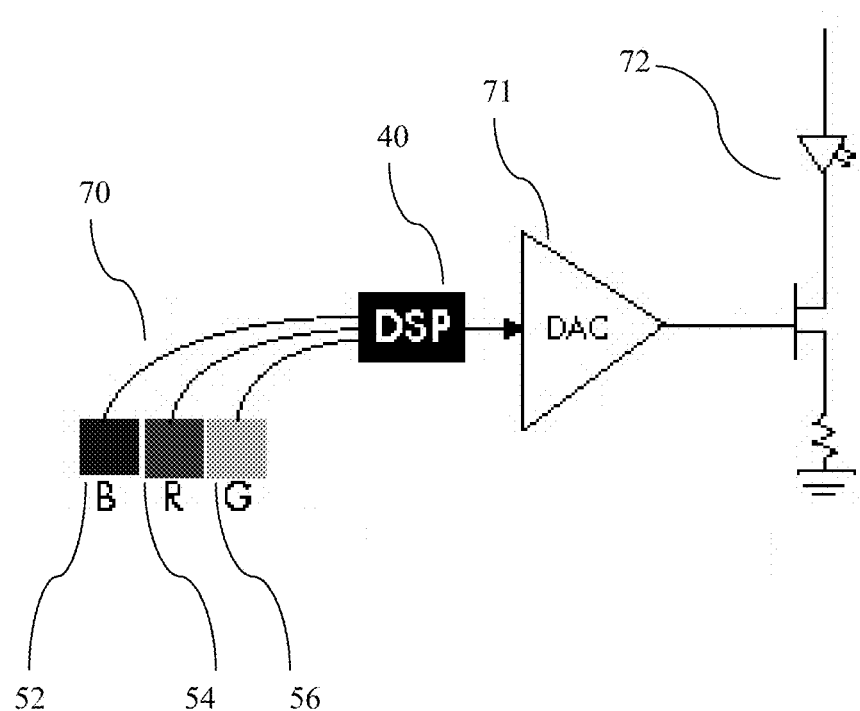
FIG. 4 is a DAC circuit for driving the laser intensity signals.

The RGB DAC Circuit is illustrated in FIG. 4 and holds the intensity value of the laser at a constant value. Thus, the Photodiode Feedback circuit 70 adjusts each color laser's output intensity by monitoring environmental conditions and detector sampling variations. The DSP 40 adjusts the drive signal based on the signal strength from the respective feedback diode. The drive signal is then converted by the DAC 71 to the appropriate level to drive the laser diode 72. A similar circuit is provided for each of the laser diode emitters. Thus, the laser diode 72 in FIG. 4 represents each of the laser diodes 22, 24, 26 in FIG. 1.

An alternate embodiment includes multiple IR/R/G/B emitter detector sets located along vertical planes to form multiple rows of emitter/detector pairs, each row being substantially the same as described above. Thus, as shown in FIG. 1 the system preferably includes a single set of emitters and detectors positioned along a horizontal line. In an alternate version, multiple sets of such emitters and detectors may be positioned in similar horizontal lines, with separate sets of emitters and detectors being positioned above and below one another to form a column.

Figure 5:
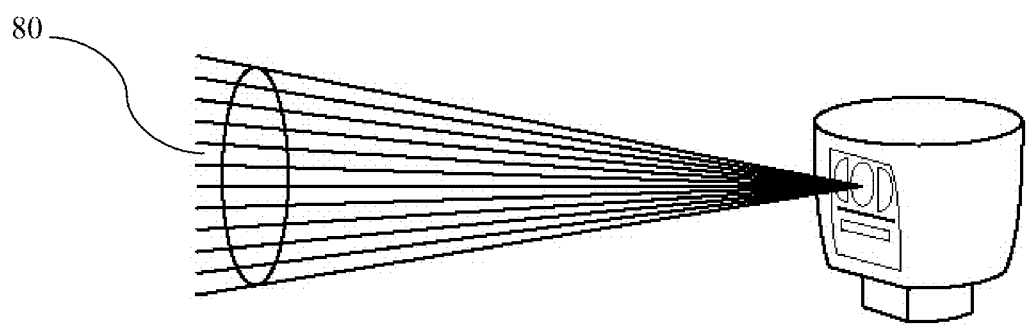
FIG. 5 is a perspective view of an embodiment of the invention having multiple sets of lasers.

In such an alternate version of the device, as shown in FIG. 5, multiple sets of IR, Red, Blue, and Green emitter/detector pairs are aligned and oriented to emit and detect laser radiation at multiple defined angles along the Z axis. Each of the sets preferably has a constant angular offset 80 from each other set of emitter/detectors. This enables the scanner/device to create an image having a desired height without any movement along the Z axis. There is no theoretical limit to the number of laser sets that can be aligned in this manner. One exemplary version has 12 sets of lasers across a 24 degree vertical field of view, thus having each laser set aligned a ½ degree increments as shown in FIG. 5.

In another version, enough IR/R/G/B sets are combined together to provide a full image, and/or the color scanner is actuated so as to capture a full 3D image such as that captured by a movie camera. This color movie camera device would be entirely reliant on its own light so would operate without any concern for lighting conditions. It would also provide a full 3D image since all the pixels would have precise distances associated with them. Two such cameras positioned on either side of a moving object would give the effect of a moving hologram of the object in the camera's field of view.

In yet another alternate version of the invention, the IR emitter 20 and detector 30 are omitted. As a substitute for the IR emitter/detectors in order to obtain ranging information, one of the color emitter detector pairs is used to obtain ranging information. Preferably, the green emitter 26 and detector 36 are used for this purpose. Accordingly, the green emitter in this version operates in a pulsed fashion in the manner of the IR emitter of the first version described above. The red and blue emitters continue to operate in a steady state. The detected radiation from the green emitter is then used to provide both ranging and intensity information that was provided by the IR emitter, as well as to provide color information in the green spectrum.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A color scanning system, comprising:
   an infrared laser configured to transmit a pulsed infrared light;
   an infrared detector positioned to receive the infrared pulsed infrared light when reflected from an object;
   a blue laser configured to transmit a steady blue light;
   a blue detector positioned to receive the blue light when reflected from the object;
   a red laser configured to transmit a steady red light;
   a red detector positioned to receive the red light when reflected from the object;
   a green laser configured to transmit a steady green light;
   a green detector positioned to receive the green light when reflected from the object; and
   a processor in communication with the infrared detector to determine a distance from the scanning system to the object based on a time between a transmitted infrared light pulse and a received infrared light pulse, the processor further being in communication with the red detector, the blue detector, and the green detector to render a color pixel in space.

2. The system of claim 1, wherein the system further comprises a housing, the infrared laser, red laser, blue laser, and green laser each being contained within the housing.

3. The system of claim 2, further comprising a motor, the motor being configured to move the housing.

4. The system of claim 3, wherein the motor is configured to rotate the housing about a vertical axis.

5. The system of claim 1, wherein the processor is a digital signal processor.

6. The system of claim 5, further comprising a feedback circuit in communication with the digital signal processor, the feedback circuit further receiving the blue light, red light, and green light directly from the blue laser, red laser, and green laser respectively.

7. The system of claim 6, wherein the feedback circuit further comprises a blue feedback detector, a red feedback detector, and a green feedback detector.

8. The system of claim 7, wherein the digital signal processor is configured to adjust a signal strength of any one of the blue laser, red laser, or green laser as a function of light received by a respective one of the blue feedback detector, the red feedback detector, or the green feedback detector.

9. The system of claim 3, wherein each of the infrared laser, blue laser, red laser, green laser, infrared detector, blue detector, red detector, and green detector are configured to form a first horizontal row, the first horizontal row being substantially perpendicular to the vertical axis.

10. The system of claim 9 wherein each of the infrared laser, blue laser, red laser, and green laser are oriented to transmit at an angle below the horizontal.

11. The system of claim 9, further comprising a plurality of additional horizontal rows, each one of the additional horizontal rows having an additional infrared laser, blue laser, red laser, green laser, infrared detector, blue detector, red detector, and green detector, each one of the additional horizontal rows being oriented to transmit and detect light at an angle that is vertically offset from an adjacent one of the plurality of additional horizontal rows.

12. The system of claim 1, further comprising:
   a plurality of additional infrared lasers configured to transmit a plurality of additional pulsed infrared lights;
   a plurality of additional infrared detectors positioned to receive the plurality of additional infrared pulsed infrared lights when reflected from the object;

a plurality of additional blue lasers configured to transmit a plurality of additional steady blue lights;

a plurality of additional blue detectors positioned to receive the plurality of additional blue lights when reflected from the object;

a plurality of additional red lasers configured to transmit a plurality of additional steady red lights;

a plurality of additional red detectors positioned to receive the plurality of additional red lights when reflected from the object;

a plurality of additional green lasers configured to transmit a plurality of additional steady green lights; and a plurality of additional green detectors positioned to receive the plurality of additional green lights when reflected from the object;

each one of the plurality of additional infrared detectors being angularly offset from the others with respect to a vertical axis, each one of the plurality of additional blue detectors being angularly offset from the others with respect to a vertical axis, each one of the plurality of additional red detectors being angularly offset from the others with respect to a vertical axis, and each one of the plurality of additional green detectors being angularly offset from the others with respect to a vertical axis;

each one of the plurality of additional infrared detectors, blue detectors, red detectors, and green detectors further being in communication with the processor, the processor further being configured to render a plurality of additional color pixels in space.

13. The system of claim 1, wherein the processor is further configured to divide each of the received red light, the received blue light, and the received green light into respective pluralities of pixels corresponding to the received pulsed infrared light, the processor further being configured to interpolate from among each of the pluralities of red light pixels, blue light pixels, and green light pixels to render the color pixel in space.

14. The system of claim 1, further comprising:

a blue light filter positioned to allow substantially only blue light to be detected by the blue detector;

a red light filter positioned to allow substantially only red light to be detected by the red detector; and a green light filter positioned to allow substantially only green light to be detected by the green detector.

* * * * *